US010579791B2

United States Patent
Zhang et al.

(10) Patent No.: US 10,579,791 B2
(45) Date of Patent: Mar. 3, 2020

(54) TECHNOLOGIES TO DEFEAT SECURE ENCLAVE SIDE-CHANNEL ATTACKS USING FAULT-ORIENTED PROGRAMMING

(71) Applicant: Intel Corporation, Santa Clara, CA (US)

(72) Inventors: Mingwei Zhang, Hillsboro, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 15/061,489

(22) Filed: Mar. 4, 2016

(65) Prior Publication Data
US 2017/0255416 A1 Sep. 7, 2017

(51) Int. Cl.
*G06F 21/53* (2013.01)
(52) U.S. Cl.
CPC ........ *G06F 21/53* (2013.01); *G06F 2221/033* (2013.01)
(58) Field of Classification Search
None
See application file for complete search history.

(56) References Cited

U.S. PATENT DOCUMENTS

| 2013/0159726 A1* | 6/2013 | McKeen | G06F 21/72 |
| | | | 713/189 |
| 2016/0378688 A1* | 12/2016 | Rozas | G06F 12/1408 |
| | | | 713/190 |
| 2017/0068455 A1* | 3/2017 | Xing | G06F 3/0605 |

* cited by examiner

*Primary Examiner* — Benjamin E Lanier
(74) *Attorney, Agent, or Firm* — Barnes & Thornburg LLP (57) ABSTRACT

Technologies for defeating secure enclave side-channel attacks include a computing device having a processor with secure enclave support. The computing device instruments an executable binary with multiple gadgets, a fault-generating function, and at least one invocation of the fault-generating function. The computing device executes the instrumented executable binary within a secure enclave. During execution of the instrumented binary, each gadget may be located at a different memory page of the secure enclave. The computing device invokes the fault-generating function, which selects a random sequence of the gadgets and executes the random sequence of gadgets. The processor may generate a page fault in response to executing each of the gadgets. Each gadget may generate one or more data accesses to memory pages within the secure enclave. The processor may generate a page fault in response to each of the data accesses. Other embodiments are described and claimed.

25 Claims, 4 Drawing Sheets

TECHNOLOGIES TO DEFEAT SECURE ENCLAVE SIDE-CHANNEL ATTACKS USING FAULT-ORIENTED PROGRAMMING

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. SGX operates in ring-3 (a lower privilege mode of the processor). Thus, SGX may allow untrusted OS/VMMs to host trusted execution environments without the risk of loss of confidentiality from attacks in the OS/VMM.

An attacker with full control of the OS/VMM may attempt a side-channel attack on a secure enclave by manipulating page table permissions. For example, an attacker may set page table permissions to induce a page fault any time a secure enclave jumps into a new code page or accesses a new data page. By doing so, an attacker may recover a coarse control-flow graph of the secure enclave or memory access patterns of the secure enclave. One potential side-channel attack is described by Yuanzhong Xu et al., *Controlled-Channel Attacks: Deterministic Side Channels for Untrusted Operating Systems*, IEEE Symposium on Security & Privacy (2015). Potential defensive approaches to such side-channel attacks include static code randomization, static code reorganization (e.g., reorganizing the program to cause any execution path to generate the same page access patterns), and execution path randomization (e.g., random execution of multiple versions of the code). Such approaches may be susceptible to profiling attacks, and execution path randomization has only limited randomness and increases memory usage due to code duplication. Oblivious memory, which generates memory access patterns that are indistinguishable for any inputs with the same running time, may also defend against such side-channel attacks. Oblivious memory requires rewriting source code and is expected to reduce execution speed by more than ten times.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
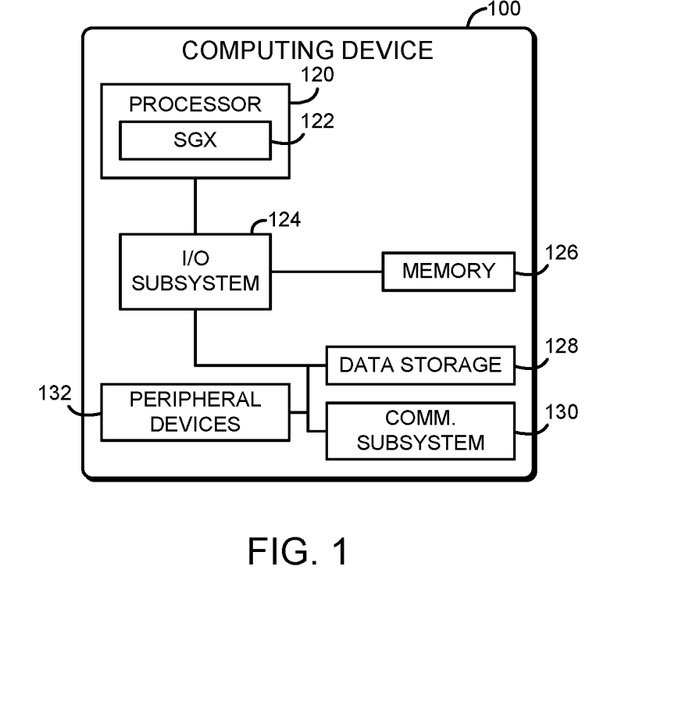
FIG. 1 is a simplified block diagram of at least one embodiment of a computing device for defeating secure enclave side-channel attacks using fault-oriented programming.

Referring now to FIG. 1, in an illustrative embodiment, a computing device 100 for protecting against secure enclave side-channel attacks includes a processor 120 that supports secure enclaves (e.g., a processor 120 that supports Intel® SGX technology). In use, as described further below, the computing device 100 instruments a secure enclave binary with a fault-generating function, multiple gadgets, and multiple invocations of the fault-generating function. At runtime, the instrumented binary invokes the fault-generating function, and the fault-generating function selects a random sequence of gadgets to execute. Executing each gadget in the sequence may cause the processor 120 to generate a page fault associated with the memory page of the gadget. Each gadget may also perform one or more data accesses, which may also generate page faults. The fault-generating function may randomly select memory addresses for those data accesses as described further below. Thus, the computing device 100 may add random noise to the sequence of page faults generated by the secure enclave binary. This random noise may defeat side-channel attacks that observe the page fault sequence. Additionally, because the page fault sequence changes dynamically, the computing device 100 may not be vulnerable to profiling attacks. By using binary instrumentation, the computing device 100 may protect from side-channel attacks without requiring modification of existing binaries and/or source code. It is expected that the computing device 100 may provide protection from side-channel attacks with a roughly two-times slowdown compared to unprotected code. Thus, the computing device 100 may provide performance that is much better than other techniques such as oblivious memory, which is expected to reduce execution speed by more than ten times.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 126, a data storage device 128, and communication circuitry 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. Additionally, part of the memory 126 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 126.

The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store one or more executable binary images. Each executable binary image may include unencrypted code and/or data that is to be initially loaded into a secure enclave and then measured or otherwise verified before the secure enclave is executed.

The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
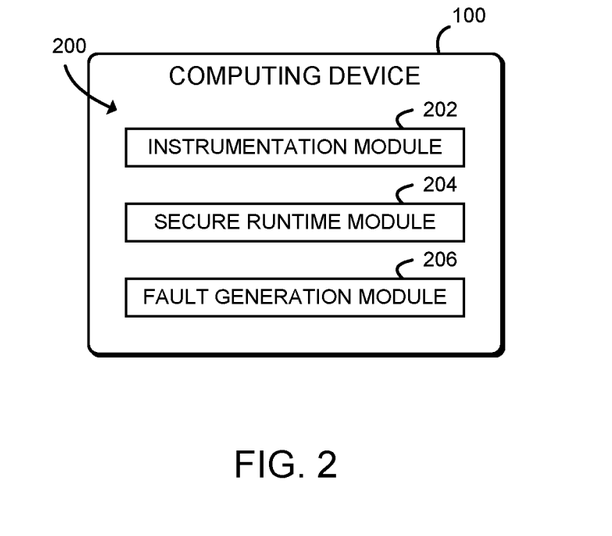
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an instrumentation module 202, a secure runtime module 204, and a fault generation module 206. The various modules of the environment 200 may be embodied as hardware, firmware, software, or a combination thereof. As such, in some embodiments, one or more of the modules of the environment 200 may be embodied as circuitry or collection of electrical devices (e.g., instrumentation circuitry 202, secure runtime circuitry 204, and/or fault generation circuitry 206). It should be appreciated that, in such embodiments, one or more of the instrumentation circuitry 202, the secure runtime circuitry 204, and/or the fault generation circuitry 206 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The instrumentation module 202 is configured to instrument an executable binary with multiple gadgets, a fault-generating function, and an at least one invocation of the fault-generating function to generate an instrumented binary. Each of the gadgets may be embodied as a return-oriented programming gadget.

The secure runtime module 204 is configured to execute the instrumented binary within a secure enclave after instrumentation of the executable binary. The secure enclave is established with the secure enclave support 122 of the processor 120. During execution, each gadget of the instrumented binary is located at a predefined offset within a different memory page of the secure enclave. Each of those memory pages may correspond to a page in an enclave page cache maintained in the memory 126. The secure runtime module 204 is further configured to invoke the fault-generating function in response to execution of the instrumented binary.

The fault generation module 206 is configured to select a random sequence of gadgets in response to invocation of the fault-generating function and to execute the random sequence of gadgets. Selecting the random sequence of the plurality of gadgets may include randomly selecting a page index and then determine an address of a gadget as a function of the page index and the predefined offset within the memory page. Executing each gadget may generate a page fault, for example when the operating system or VMM is controlled by an attacker. In some embodiments, executing a gadget may also generate a data access to a memory page of the secure enclave, which may also generate a page fault. In some embodiments, selecting the random sequence of gadgets may include configuring a user stack of the secure enclave to reference the random sequence of gadgets.

Figure 3:
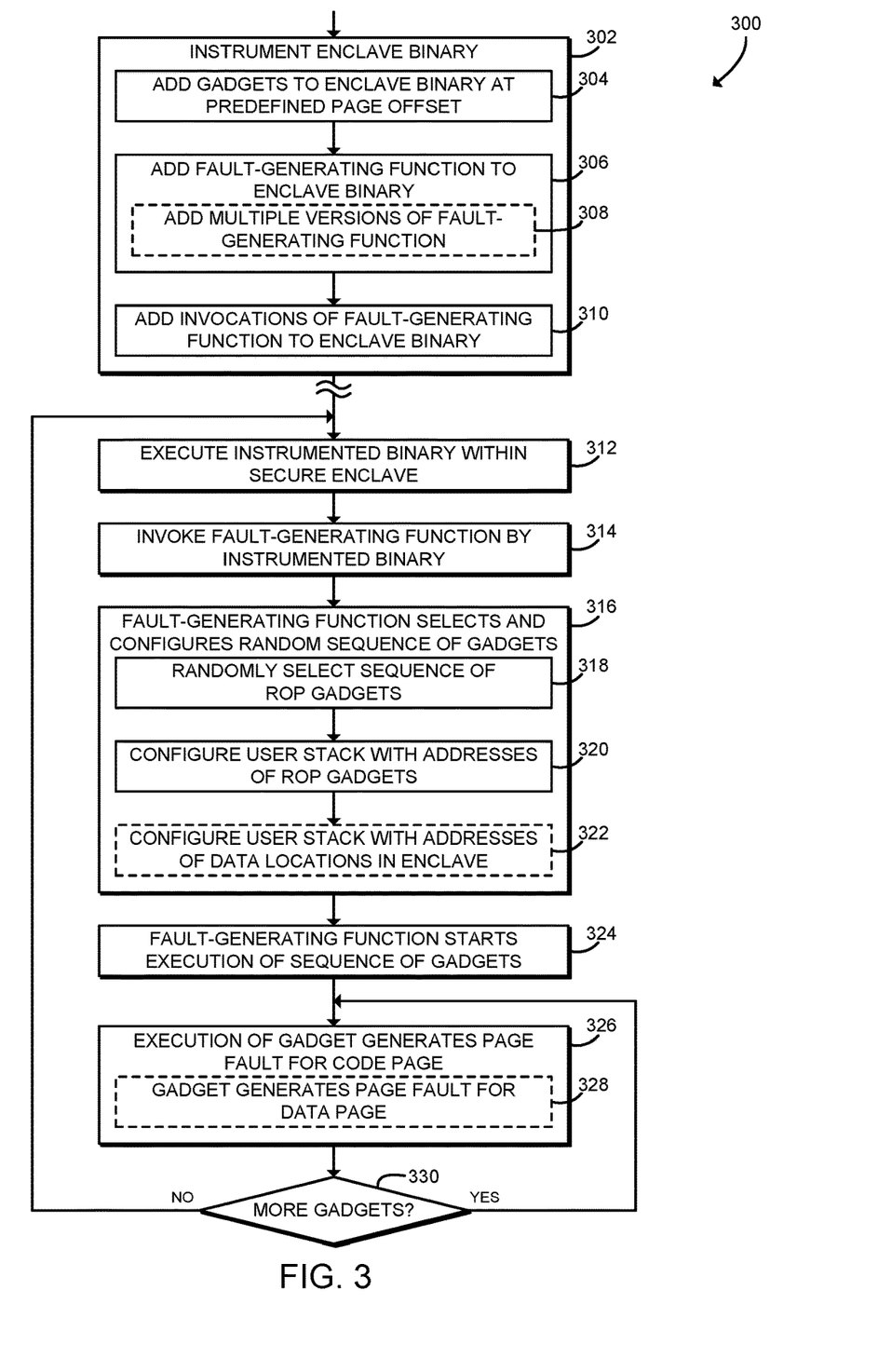
FIG. 3 is a simplified flow diagram of at least one embodiment of a method for defeating secure enclave side-channel attacks using fault-oriented programming that may be executed by the computing device of FIGS. 1-2.

Referring now to FIG. 3, in use, the computing device 100 may execute a method 300 for defeating side-channel attacks using fault-oriented programming. The method 300 begins in block 302, in which the computing device 100 instruments an enclave binary to prepare for fault-oriented programming Instrumentation of the enclave binary inserts additional code to defeat side-channel attacks into the enclave binary, producing an instrumented binary. By instrumenting the enclave binary, protection against side-channel attacks may be added to an existing program without modifying the enclave binary or the enclave source code. The computing device 100 may instrument the enclave binary statically or dynamically. For example, the enclave binary may be instrumented statically during or after compilation or may be instrumented dynamically using a binary translation tool such as Pin.

In block 304, the computing device 100 adds one or more gadgets to the enclave binary. Each gadget may be embodied as a short segment of executable code that may generate one or more memory accesses, including code accesses or data accesses. The gadgets may be located throughout the virtual memory space of the enclave binary, so that each gadget resides in a different memory page. Each gadget may be added at the same predefined offset within the associated memory page. In the illustrative embodiment, the gadgets are return-oriented programming (ROP) gadgets, which may be embodied as short segments of code ending with a return instruction (e.g., RET). Additionally or alternatively, the gadgets may be embodied as jump-oriented programming (JOP) gadgets, call-oriented programming (COP) gadgets, or gadgets using any other appropriate programming technique.

In block 306, the computing device 100 adds a fault-generating function to the enclave binary. As described further below, when invoked at runtime the fault-generating function selects a random sequence of gadgets that, when invoked, will generate a random sequence of memory page accesses (including code and/or data accesses). In some embodiments, in block 308 the computing device 100 may add multiple versions of the fault-generating function. Each version of the fault-generating function may be located in a different memory page, which may prevent side-channel attacks from identifying the fault-generating function itself. In block 310, the computing device 100 adds one or more invocations of the fault-generating function to the enclave binary. The invocations of the fault-generating function may be located throughout the enclave binary. Each invocation of the fault-generating function does not alter the semantics of the enclave binary.

Figure 4:
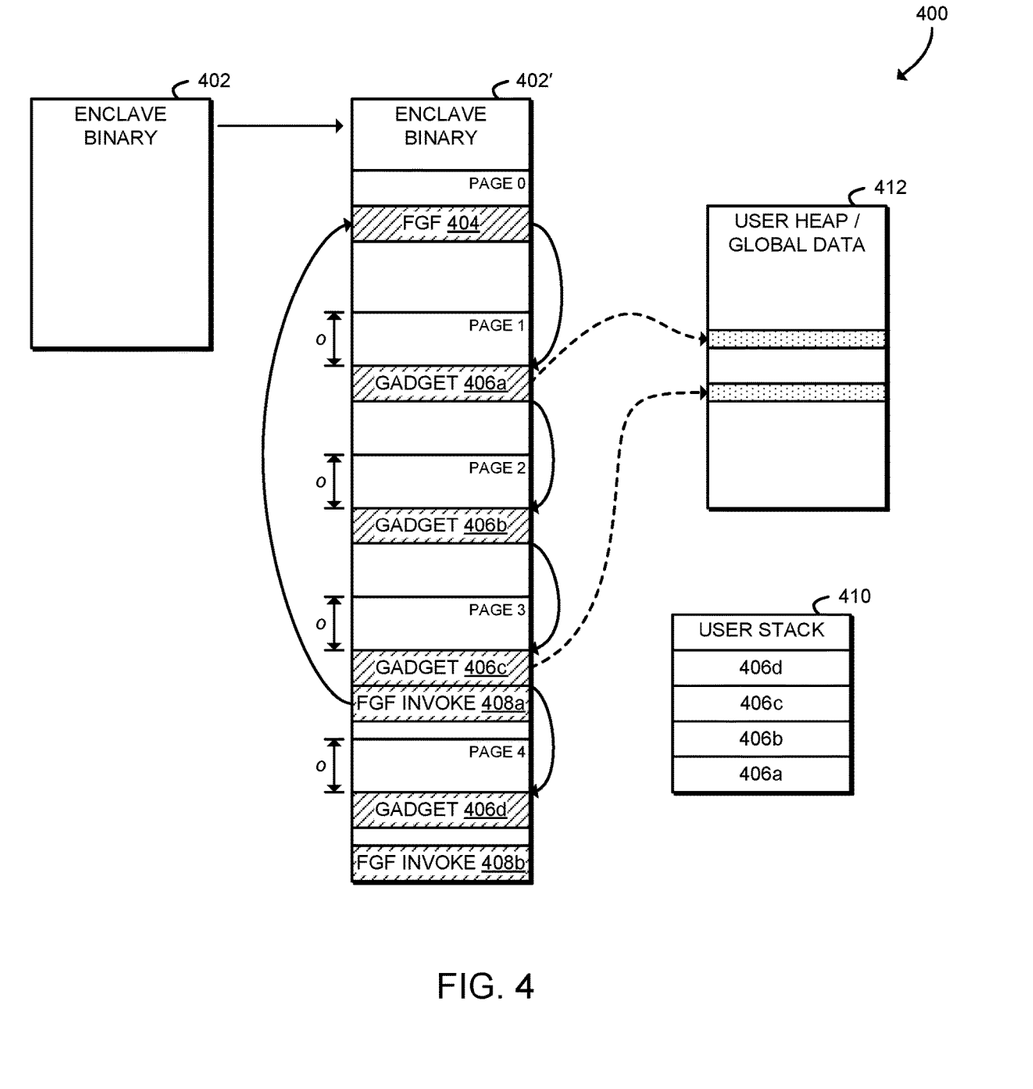
FIG. 4 is a schematic diagram illustrating an enclave memory layout that may be established by the computing device of FIGS. 1-2.

Referring now to FIG. 4, schematic diagram 400 illustrates one potential embodiment of instrumenting an enclave binary. An initial enclave binary 402 is shown. The enclave binary 402 may be embodied as, for example, a binary image file stored in the data storage device 128 and/or the contents of a secure enclave established in the memory 126. The enclave binary 402 is instrumented by the computing device 100 to generate the instrumented enclave binary 402'. As shown, the instrumented enclave binary 402' includes a fault-generating function 404, four gadgets 406a through 406d, and two invocations 408a, 408b of the fault-generating function 404. As shown, each of the gadgets 406 is located at the same predefined offset o within the associated memory page. Although the instrumented enclave binary 402' is shown as including five memory pages, it should be understood that in some embodiments the instrumented enclave binary 402' may include many more memory pages.

Referring back to FIG. 3, after instrumenting the enclave binary, in block 312 the computing device 100 executes the enclave binary within a secure enclave. As described above, the secure enclave may be established using the secure enclave support 122 of the processor 120. For example, the enclave binary may be executed within a secure enclave established using Intel SGX technology. Thus, the enclave binary may be measured and verified, and the code and data of the secure enclave (including the instrumented enclave binary) may be encrypted and otherwise protected from a malicious OS, VMM, or other software entity of the computing device 100. However, the OS/VMM may retain control over the page tables of the computing device 100, and a malicious OS or VMM may manipulate page table permissions to observe the page fault sequence of the enclave binary. Additionally, although in the illustrative embodiment the same computing device 100 instruments the enclave binary and then executes the enclave binary, it should be understood that in some embodiments those functions may be performed by different devices. For example, in some embodiments the enclave binary may be statically instrumented by a compiler computing device 100a and then distributed to an end-user computing device 100b to be executed.

In block 314, the enclave binary executed by the computing device 100 invokes the fault-generating function within the secure enclave. The computing device 100 may execute an invocation of the fault-generating function that was inserted into the enclave binary during binary instrumentation as described above. The computing device 100 continues to execute the fault-generating function within the secure enclave.

In block 316, the fault-generating function executed by the computing device 100 selects and configures a random sequence of gadgets. The computing device 100 may select a random order of gadgets and/or a random number of gadgets to execute. As described further below, execution of the random sequence of gadgets may generate a random sequence of page faults to prevent side-channel attacks. In block 318, in the illustrative embodiment the computing device 100 selects a random sequence of return-oriented programming (ROP) gadgets. The computing device 100 may select a random order of some or all of the ROP gadgets in the instrumented enclave binary. In some embodiments, the computing device 100 may select a random number of ROP gadgets to invoke (including a random number of invocations of the same ROP gadget). To select an ROP gadget, the computing device 100 may randomly select a page index within the instrumented enclave binary image and calculate the address of the gadget using the predefined offset of each gadget within the associated memory page. For example, the computing device 100 may calculate the address of the ROP gadget as the base address of the instrumented enclave binary, plus the randomly selected index times the page size (e.g., 4096), and plus the predefined offset. The predefined offset and the valid code range of the instrumented enclave binary may be embedded directly in the fault-generating function, and thus calculating the address of each gadget may not require additional memory accesses.

In block 320, the computing device 100 configures a user stack of the secure enclave with the memory addresses of the random sequence of ROP gadgets. During execution, each ROP gadget may execute a return instruction, which pops an address from the user stack and jumps to that address. The address popped from the user stack may correspond to the next ROP gadget in the random sequence. The last entry of the user stack may cause execution to return to the fault-generating function or otherwise restore normal execution of the secure enclave. In some embodiments, in block 322 the computing device 100 may configure the user stack with one or more addresses of data locations in enclave memory. For example, the computing device 100 may include addresses corresponding to locations within the user heap, global variables, or other application data used by the instrumented binary executing within the secure enclave. As described further below, during execution the ROP gadgets may access data located at the memory addresses referenced in the user stack.

Although illustrated as selecting and configuring a random sequence of ROP gadgets, in some embodiments the computing device 100 may select and configure a sequence of gadgets using any appropriate programming technology. For example, in some embodiments, the computing device 100 may select a random sequence of jump-oriented programming (JOP) or call-oriented programming (COP) gadgets and configure a dispatch table with the addresses of the random sequence of gadgets. Each gadget may include an indirect jump instruction or indirect call instruction to the dispatch table, which causes execution to branch to the next gadget in the sequence.

In block 324, the fault-generating function executed by the computing device 100 within the secure enclave starts execution of the random sequence of gadgets. For example, the computing device 100 may jump to the address of the first gadget in the sequence and begin execution. In block 326, execution of the gadget may generate a page fault for the associated code page of the gadget in the memory 126. As described above, a malicious operating system may restrict access to memory pages of the secure enclave, for example by marking those pages as invalid in a system page table. When execution of the secure enclave jumps to a code page with restricted access, the processor 120 generates a page fault that may be handled by the operating system. In some embodiments, the page fault may expose the base address of the faulting memory page, and the secure enclave support 122 may clear the offset of the faulting address within the memory page. By thus executing the memory page of the gadget, the computing device 100 inserts random noise into the page fault sequence of the secure enclave, which may defeat side-channel attacks. In some embodiments, in block 328 the gadget executed by the computing device 100 may generate a page fault for a data page in the memory 126. The gadget may make a data access (e.g., a memory read and/or write) to an address of a data location within the secure enclave. The computing device 100 may read or write data specified by the fault-generating function as described above, for example, accessing a memory address identified in the user stack. Thus, the computing device 100 may insert additional random noise into the page fault sequence.

In block 330, the computing device 100 determines whether additional gadgets remain to be executed. For example, the computing device 100 may access a user stack, which may include an address of the next gadget to be executed. As another example, the computing device 100 may determine whether a dispatch table includes additional entries for gadgets to be executed. If additional gadgets remain to be executed, the method 300 loops back to block 326 to continue executing gadgets and potentially generating page faults. If no further gadgets remain to be executed, the method 300 loops back to block 312 to continue executing the enclave binary within the secure enclave.

Referring again to FIG. 4, the schematic diagram 400 illustrates one potential embodiment of a sequence of return-oriented programming gadgets. As shown, at runtime the invocation 408a may invoke the fault-generating function 404. After being invoked, the fault-generating function 404 may select the sequence of gadgets 406a, 406b, 406c, 406d. The fault-generating function 404 may configure a user stack 410 to include the sequence of gadgets 406a, 406b, 406c, 406d. As shown, those gadgets 406 are included in reverse order in the stack 410, which grows downward. The fault-generating function 404 may execute a return instruction, which pops the address of the gadget 406a from the stack 410 and jumps to the gadget 406a. In turn, the gadget 406a executes a return instruction that pops the address of the gadget 406b from the stack 410 and jumps to the gadget 406b, and so on. As shown, the gadgets 406a, 406c also make data accesses to locations in the user heap/global data 412 of the secure enclave. Each of those accesses—to the gadgets 406a, 406b, 406c, 406d and to the user heap/global data 412—may generate a page fault.

Figure 5:
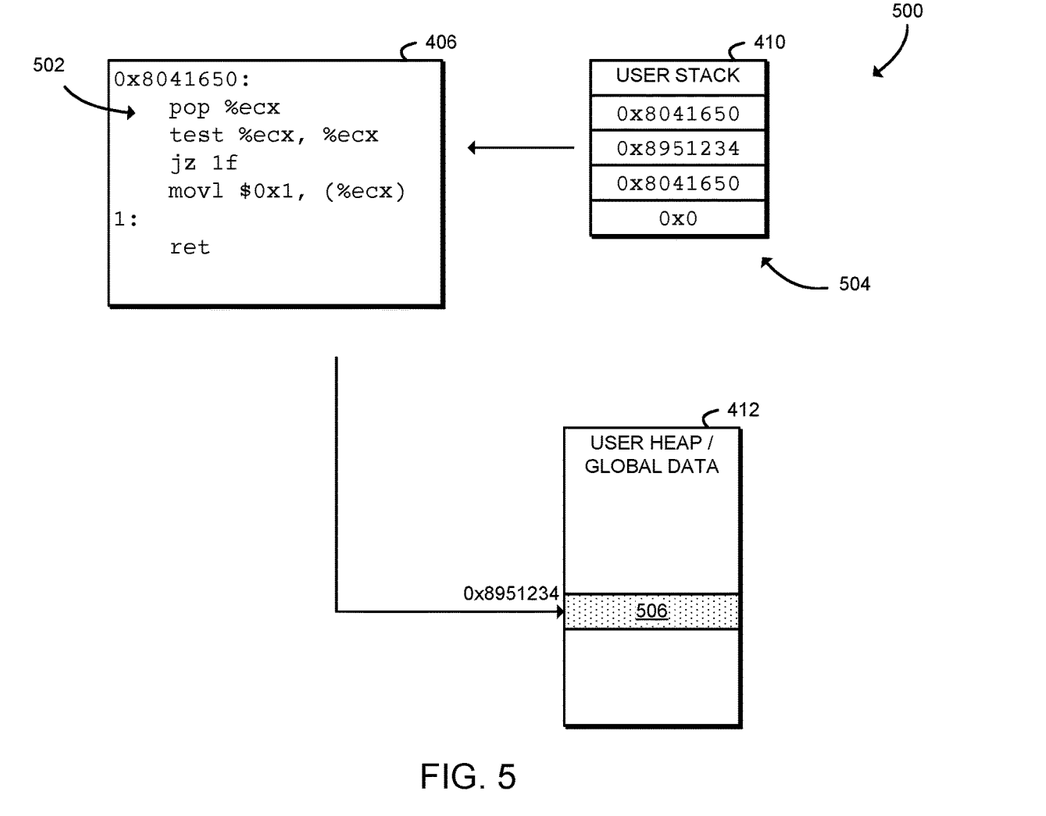
FIG. 5 is a schematic diagram illustrating execution of a fault-oriented programming gadget that may be performed by the computing device of FIGS. 1-2.

Referring now to FIG. 5, schematic diagram 400 illustrates one potential embodiment of a return-oriented programming (ROP) gadget 406. Pseudocode 502 illustrates the instructions included in the ROP gadget 406. As shown, the illustrative gadget 406 starts execution at address 0x8041650, pops a value from the stack and if that value is nonzero accesses data at an address in memory identified by that value. The gadget 406 ends with a return instruction, which pops the return address from the stack and jumps to that address.

The diagram 500 illustrates a user stack 410 loaded with illustrative values 504. The illustrative stack values 504 encode a sequence of gadget executions and data accesses that may be executed at runtime. When the gadget 406 is first executed, the value 0x0 is popped from the stack. Because this value is zero, the gadget does not generate a data access and executes a return instruction. That return instruction causes execution to jump to the address at the top of the stack, which is the address of the ROP gadget 406 (i.e., 0x8041650). During the second execution of the ROP gadget 406, the value 0x8951234 is popped from the stack. Because this value is nonzero, the gadget 406 writes an immediate value 0x1 to a memory location 506 in the user heap/global data 412, which is located at the address 0x8951234 previously popped from the stack. After accessing that data location, the gadget 406 executes a return instruction, which causes execution to jump back to the beginning of the ROP gadget 406. Thus, execution of the sequence of ROP gadgets 406 may continue based on the contents of the user stack 410. As shown, the fault-generating function may configure the user stack 410 to control the execution order of the ROP gadgets 406 as well as the locations of data accesses by the ROP gadgets 406. In particular, the same gadget 406 may be configured to generate a random sequence of page faults caused by data accesses.

Figure 6:
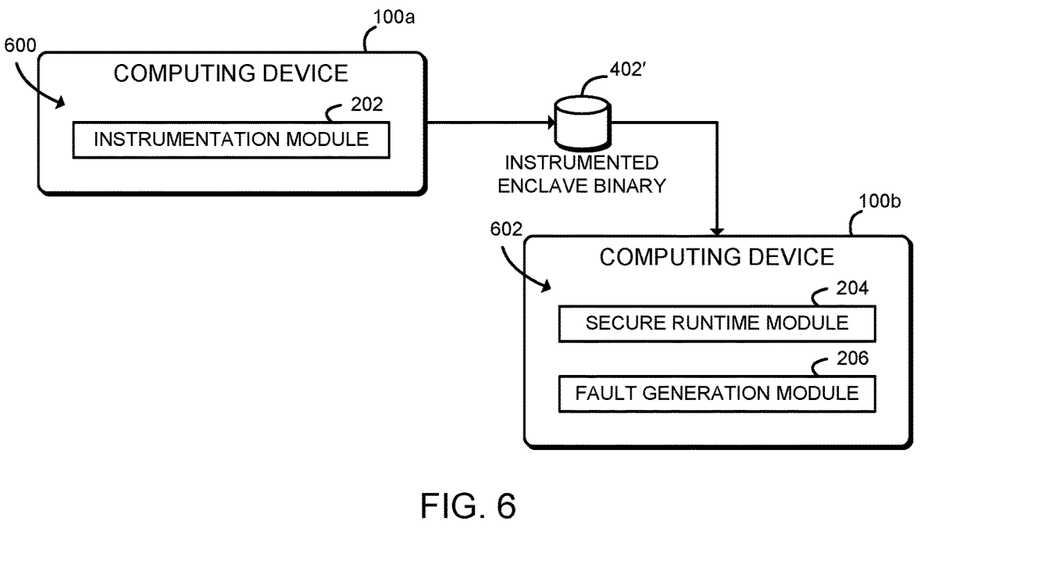
FIG. 6 is a simplified block diagram of at least one embodiment of various environments that may be established by the computing device of FIG. 1.

Referring now to FIG. 6, in some embodiments, the functions of the computing device 100 may be distributed among multiple computing devices 100. In one such embodiment, a computing device 100a may establish an environment 600 during operation and another computing device 100b may establish an environment 602 during operation. The illustrative environment 600 includes the instrumentation module 202, and the illustrative environment 602 includes the secure runtime module 204 and the fault generation module 206. The various modules of the environments 600, 602 may be embodied as hardware, firmware, software, or a combination thereof, and are configured to perform the same functions as described above in connection with FIG. 2. Thus, as shown, in use the computing device 100a (e.g., a compiler computing device 100a) may generate an instrumented enclave binary 402' that is distributed to the computing device 100b (e.g., an end-user computing device 100b) and executed.

It should be appreciated that, in some embodiments, the method 300 may be embodied as various instructions stored on a computer-readable media, which may be executed by the processor 120, the I/O subsystem 124, and/or other components of the computing device 100 to cause the computing device 100 to perform the method 300. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for secure execution, the computing device comprising an instrumentation module to instrument an executable binary with a plurality of gadgets, a fault-generating function, and an invocation of the fault-generating function to generate an instrumented binary; a secure runtime module to (i) execute the instrumented binary within a secure enclave, wherein the secure enclave is established with secure enclave support of a processor of the computing device, and wherein each gadget of the plurality of gadgets is located at a predefined offset within a different memory page of the secure enclave, and (ii) invoke the fault-generating function in response to execution of the instrumented binary; and a fault generation module to (i) select a random sequence of the plurality of gadgets in response to invocation of the fault-generating function and (ii) execute the random sequence of the plurality of gadgets.

Example 2 includes the subject matter of Example 1, and wherein to execute the random sequence of the plurality of gadgets comprises to generate a page fault for each gadget of the plurality of gadgets.

Example 3 includes the subject matter of any of Examples 1 and 2, and wherein to select the random sequence of the plurality of gadgets comprises to select a sequence of gadgets from the plurality of gadgets in a random order.

Example 4 includes the subject matter of any of Examples 1-3, and wherein the select the random sequence of the plurality of gadgets comprises to (i) randomly select a page index and (ii) determine an address of a gadget as a function of the page index and the predefined offset within the memory page.

Example 5 includes the subject matter of any of Examples 1-4, and wherein to select the random sequence of the plurality of gadgets comprises to select a random number of gadgets from the plurality of gadgets.

Example 6 includes the subject matter of any of Examples 1-5, and wherein to instrument the executable binary comprises to add a plurality of versions of the fault-generating function to the executable binary; and add a plurality of invocations of the fault-generating function to the executable binary, wherein each invocation of the plurality of invocations is to invoke a version of the fault-generating function.

Example 7 includes the subject matter of any of Examples 1-6, and wherein the plurality of gadgets comprises a plurality of return-oriented programming gadgets; and to select the random sequence of the plurality of gadgets comprises to configure a user stack of the secure enclave to reference the random sequence of the plurality of gadgets.

Example 8 includes the subject matter of any of Examples 1-7, and wherein the plurality of gadgets comprises a plurality of jump-oriented programming gadgets; and to select the random sequence of the plurality of gadgets comprises to configure a dispatch table of the secure enclave to reference the random sequence of the plurality of gadgets.

Example 9 includes the subject matter of any of Examples 1-8, and wherein to execute the random sequence of the plurality of gadgets comprises to generate, by a first gadget of the plurality of gadgets, a data access to a memory page of the secure enclave.

Example 10 includes the subject matter of any of Examples 1-9, and wherein to generate the data access comprises to generate a page fault by the first gadget.

Example 11 includes the subject matter of any of Examples 1-10, and wherein to generate the data access comprises to access a data structure of the instrumented binary.

Example 12 includes the subject matter of any of Examples 1-11, and wherein to generate the data access comprises to access a user heap of the secure enclave.

Example 13 includes the subject matter of any of Examples 1-12, and wherein to select the random sequence of the plurality of gadgets further comprises to randomly select a memory address of the data access to the memory page of the secure enclave.

Example 14 includes the subject matter of any of Examples 1-13, and wherein to generate the data access to the memory page of the secure enclave comprises to determine, by the first gadget, an address within the memory page based on a user stack of the secure enclave.

Example 15 includes the subject matter of any of Examples 1-14, and wherein to select the random sequence of the plurality of gadgets comprises to configure the user stack to reference the address within the memory page.

Example 16 includes a method for secure execution, the method comprising instrumenting, by a computing device, an executable binary with a plurality of gadgets, a fault-generating function, and an invocation of the fault-generating function to generate an instrumented binary; executing the instrumented executable binary within a secure enclave, wherein the secure enclave is established with secure enclave support of a processor of the computing device, and wherein each gadget of the plurality of gadgets is located at a predefined offset within a different memory page of the secure enclave; invoking the fault-generating function in response to executing the instrumented binary; selecting a random sequence of the plurality of gadgets in response to invoking the fault-generating function; and executing the random sequence of the plurality of gadgets.

Example 17 includes the subject matter of Example 16, and wherein executing the random sequence of the plurality of gadgets comprises generating a page fault for each gadget of the plurality of gadgets.

Example 18 includes the subject matter of any of Examples 16-17, and wherein selecting the random sequence of the plurality of gadgets comprises selecting a sequence of gadgets from the plurality of gadgets in a random order.

Example 19 includes the subject matter of any of Examples 16-18, and wherein selecting the random sequence of the plurality of gadgets comprises selecting a random number of gadgets from the plurality of gadgets.

Example 20 includes the subject matter of any of Examples 16-19, and wherein selecting the random sequence of the plurality of gadgets comprises (i) randomly selecting a page index and (ii) determining an address of a gadget as a function of the page index and the predefined offset within the memory page.

Example 21 includes the subject matter of any of Examples 16-20, and wherein instrumenting the executable binary comprises adding a plurality of versions of the fault-generating function to the executable binary; and adding a plurality of invocations of the fault-generating function to the executable binary, wherein each invocation of the plurality of invocations is to invoke a version of the fault-generating function.

Example 22 includes the subject matter of any of Examples 16-21, and wherein instrumenting the executable binary with the plurality of gadgets comprises instrumenting the executable binary with a plurality of return-oriented programming gadgets; and selecting the random sequence of the plurality of gadgets comprises configuring a user stack of the secure enclave to reference the random sequence of the plurality of gadgets.

Example 23 includes the subject matter of any of Examples 16-22, and wherein instrumenting the executable binary with the plurality of gadgets comprises instrumenting the executable binary with a plurality of jump-oriented programming gadgets; and selecting the random sequence of the plurality of gadgets comprises configuring a dispatch table of the secure enclave to reference the random sequence of the plurality of gadgets.

Example 24 includes the subject matter of any of Examples 16-23, and wherein executing the random sequence of the plurality of gadgets comprises generating, by a first gadget of the plurality of gadgets, a data access to a memory page of the secure enclave.

Example 25 includes the subject matter of any of Examples 16-24, and wherein generating the data access comprises generating a page fault by the first gadget.

Example 26 includes the subject matter of any of Examples 16-25, and wherein generating the data access comprises accessing a data structure of the instrumented binary.

Example 27 includes the subject matter of any of Examples 16-26, and wherein generating the data access comprises accessing a user heap of the secure enclave.

Example 28 includes the subject matter of any of Examples 16-27, and wherein selecting the random sequence of the plurality of gadgets further comprises randomly selecting a memory address of the data access to the memory page of the secure enclave.

Example 29 includes the subject matter of any of Examples 16-28, and wherein generating the data access to the memory page of the secure enclave comprises determining, by the first gadget, an address within the memory page based on a user stack of the secure enclave.

Example 30 includes the subject matter of any of Examples 16-29, and wherein selecting the random sequence of the plurality of gadgets comprises configuring the user stack to reference the address within the memory page.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for secure execution, the computing device comprising means for instrumenting an executable binary with a plurality of gadgets, a fault-generating function, and an invocation of the fault-generating function to generate an instrumented binary; means for executing the instrumented executable binary within a secure enclave, wherein the secure enclave is established with secure enclave support of a processor of the computing device, and wherein each gadget of the plurality of gadgets is located at a predefined offset within a different memory page of the secure enclave; means for invoking the fault-generating function in response to executing the instrumented binary; means for selecting a random sequence of the plurality of gadgets in response to invoking the fault-generating function; and means for executing the random sequence of the plurality of gadgets.

Example 35 includes the subject matter of Example 34, and wherein the means for executing the random sequence of the plurality of gadgets comprises means for generating a page fault for each gadget of the plurality of gadgets.

Example 36 includes the subject matter of any of Examples 34 and 35, and wherein the means for selecting the random sequence of the plurality of gadgets comprises means for selecting a sequence of gadgets from the plurality of gadgets in a random order.

Example 37 includes the subject matter of any of Examples 34-36, and wherein the means for selecting the random sequence of the plurality of gadgets comprises means for selecting a random number of gadgets from the plurality of gadgets.

Example 38 includes the subject matter of any of Examples 34-37, and wherein the means for selecting the random sequence of the plurality of gadgets comprises (i) means for randomly selecting a page index and (ii) means for determining an address of a gadget as a function of the page index and the predefined offset within the memory page.

Example 39 includes the subject matter of any of Examples 34-38, and wherein the means for instrumenting the executable binary comprises means for adding a plurality of versions of the fault-generating function to the executable binary; and means for adding a plurality of invocations of the fault-generating function to the executable binary, wherein each invocation of the plurality of invocations is to invoke a version of the fault-generating function.

Example 40 includes the subject matter of any of Examples 34-39, and wherein the means for instrumenting the executable binary with the plurality of gadgets comprises means for instrumenting the executable binary with a plurality of return-oriented programming gadgets; and the means for selecting the random sequence of the plurality of gadgets comprises means for configuring a user stack of the secure enclave to reference the random sequence of the plurality of gadgets.

Example 41 includes the subject matter of any of Examples 34-40, and wherein the means for instrumenting the executable binary with the plurality of gadgets comprises means for instrumenting the executable binary with a plurality of jump-oriented programming gadgets; and the means for selecting the random sequence of the plurality of gadgets comprises means for configuring a dispatch table of the secure enclave to reference the random sequence of the plurality of gadgets.

Example 42 includes the subject matter of any of Examples 34-41, and wherein the means for executing the random sequence of the plurality of gadgets comprises means for generating, by a first gadget of the plurality of gadgets, a data access to a memory page of the secure enclave.

Example 43 includes the subject matter of any of Examples 34-42, and wherein the means for generating the data access comprises means for generating a page fault by the first gadget.

Example 44 includes the subject matter of any of Examples 34-43, and wherein the means for generating the data access comprises means for accessing a data structure of the instrumented binary.

Example 45 includes the subject matter of any of Examples 34-44, and wherein the means for generating the data access comprises means for accessing a user heap of the secure enclave.

Example 46 includes the subject matter of any of Examples 34-45, and wherein the means for selecting the random sequence of the plurality of gadgets further comprises means for randomly selecting a memory address of the data access to the memory page of the secure enclave.

Example 47 includes the subject matter of any of Examples 34-46, and wherein the means for generating the data access to the memory page of the secure enclave comprises means for determining, by the first gadget, an address within the memory page based on a user stack of the secure enclave.

Example 48 includes the subject matter of any of Examples 34-47, and wherein the means for selecting the random sequence of the plurality of gadgets comprises means for configuring the user stack to reference the address within the memory page.

The invention claimed is:

1. A computing device for secure execution, the computing device comprising:
   a processor with secure enclave support; and
   one or more memory devices having stored therein a plurality of instructions that, when executed by the processor, cause the computing device to establish:
   an instrumentation module to instrument an executable binary with a plurality of gadgets, a fault-generating function, and an invocation of the fault-generating function to generate an instrumented binary;
   a secure runtime module to (i) execute the instrumented binary within a secure enclave, wherein the secure enclave is established with the secure enclave support of the processor of the computing device, and wherein each gadget of the plurality of gadgets is located at a predefined offset within a different memory page of the secure enclave, and (ii) invoke the fault-generating function in response to execution of the instrumented binary; and
   a fault generation module to (i) select a random sequence of the plurality of gadgets in response to invocation of the fault-generating function and (ii) execute the random sequence of the plurality of gadgets.

2. The computing device of claim 1, wherein to execute the random sequence of the plurality of gadgets comprises to generate a page fault for each gadget of the plurality of gadgets.

3. The computing device of claim 1, wherein to select the random sequence of the plurality of gadgets comprises to select a sequence of gadgets from the plurality of gadgets in a random order.

4. The computing device of claim 1, wherein the select the random sequence of the plurality of gadgets comprises to (i) randomly select a page index and (ii) determine an address of a gadget as a function of the page index and the predefined offset within the memory page.

5. The computing device of claim 1, wherein to select the random sequence of the plurality of gadgets comprises to select a random number of gadgets from the plurality of gadgets.

6. The computing device of claim 1, wherein to instrument the executable binary comprises to:
add a plurality of versions of the fault-generating function to the executable binary; and
add a plurality of invocations of the fault-generating function to the executable binary, wherein each invocation of the plurality of invocations is to invoke a version of the fault-generating function.

7. The computing device of claim 1, wherein:
the plurality of gadgets comprises a plurality of return-oriented programming gadgets; and
to select the random sequence of the plurality of gadgets comprises to configure a user stack of the secure enclave to reference the random sequence of the plurality of gadgets.

8. The computing device of claim 1, wherein to execute the random sequence of the plurality of gadgets comprises to generate, by a first gadget of the plurality of gadgets, a data access to a memory page of the secure enclave.

9. The computing device of claim 8, wherein to generate the data access comprises to generate a page fault by the first gadget.

10. The computing device of claim 8, wherein to generate the data access comprises to access a data structure of the instrumented binary.

11. The computing device of claim 8, wherein to select the random sequence of the plurality of gadgets further comprises to randomly select a memory address of the data access to the memory page of the secure enclave.

12. The computing device of claim 8, wherein to generate the data access to the memory page of the secure enclave comprises to determine, by the first gadget, an address within the memory page based on a user stack of the secure enclave.

13. The computing device of claim 12, wherein to select the random sequence of the plurality of gadgets comprises to configure the user stack to reference the address within the memory page.

14. A method for secure execution, the method comprising:
instrumenting, by a computing device, an executable binary with a plurality of gadgets, a fault-generating function, and an invocation of the fault-generating function to generate an instrumented binary;
executing the instrumented executable binary within a secure enclave, wherein the secure enclave is established with secure enclave support of a processor of the computing device, and wherein each gadget of the plurality of gadgets is located at a predefined offset within a different memory page of the secure enclave;
invoking the fault-generating function in response to executing the instrumented binary;
selecting a random sequence of the plurality of gadgets in response to invoking the fault-generating function; and
executing the random sequence of the plurality of gadgets.

15. The method of claim 14, wherein executing the random sequence of the plurality of gadgets comprises generating a page fault for each gadget of the plurality of gadgets.

16. The method of claim 14, wherein instrumenting the executable binary comprises:
adding a plurality of versions of the fault-generating function to the executable binary; and
adding a plurality of invocations of the fault-generating function to the executable binary, wherein each invocation of the plurality of invocations is to invoke a version of the fault-generating function.

17. The method of claim 14, wherein executing the random sequence of the plurality of gadgets comprises generating, by a first gadget of the plurality of gadgets, a data access to a memory page of the secure enclave.

18. The method of claim 17, wherein generating the data access comprises generating a page fault by the first gadget.

19. The method of claim 17, wherein selecting the random sequence of the plurality of gadgets further comprises randomly selecting a memory address of the data access to the memory page of the secure enclave.

20. One or more non-transitory, computer-readable storage media comprising a plurality of instructions that in response to being executed cause a computing device to:
instrument an executable binary with a plurality of gadgets, a fault-generating function, and an invocation of the fault-generating function to generate an instrumented binary;
execute the instrumented executable binary within a secure enclave, wherein the secure enclave is established with secure enclave support of a processor of the computing device, and wherein each gadget of the plurality of gadgets is located at a predefined offset within a different memory page of the secure enclave;
invoke the fault-generating function in response to executing the instrumented binary;
select a random sequence of the plurality of gadgets in response to invoking the fault-generating function; and
execute the random sequence of the plurality of gadgets.

21. The one or more non-transitory, computer-readable storage media of claim 20, wherein to execute the random sequence of the plurality of gadgets comprises to generate a page fault for each gadget of the plurality of gadgets.

22. The one or more non-transitory, computer-readable storage media of claim 20, wherein to instrument the executable binary comprises to:
add a plurality of versions of the fault-generating function to the executable binary; and
add a plurality of invocations of the fault-generating function to the executable binary, wherein each invocation of the plurality of invocations is to invoke a version of the fault-generating function.

23. The one or more non-transitory, computer-readable storage media of claim 20, wherein to execute the random sequence of the plurality of gadgets comprises to generate, by a first gadget of the plurality of gadgets, a data access to a memory page of the secure enclave.

24. The one or more non-transitory, computer-readable storage media of claim 23, wherein to generate the data access comprises to generate a page fault by the first gadget.

25. The one or more non-transitory, computer-readable storage media of claim 23, wherein to select the random sequence of the plurality of gadgets further comprises to randomly select a memory address of the data access to the memory page of the secure enclave.

* * * * *